United States Patent Office 3,846,105
Patented Nov. 5, 1974

3,846,105
METHOD OF CONTROLLING THE SHAPE OF THERMOPLASTIC, PRESS BENT SHEETS
Joseph R. Petrella, Irwin, John N. Shaw, Arnold, and Jacob R. Peternel, Pittsburgh, Pa., assignors to PPG Industries, Inc., Pittsburgh, Pa.
Filed May 9, 1973, Ser. No. 358,760
Int. Cl. C03b 23/02
U.S. Cl. 65—106                                        13 Claims

ABSTRACT OF THE DISCLOSURE

This invention relates to a method of controlling the shape of mass-produced thermoplastic sheets to within desired tolerance by adjusting the shaping surfaces of press bending molds based on newly discovered criteria in response to errors in radius of curvature of one or more regions of sheets previously shaped by said molds.

BACKGROUND OF THE INVENTION

1. Field of the Invention

This invention relates to a method of determining adjustments needed for pressing surfaces to control the contour of heat-softened thermoplastic sheets shaped by press bending.

2. Description of the Prior Art

It has long been recognized that control of glass temperature and contour of shaping members of a press bending apparatus is essential in press bending processes, such as a vertical press bending process. In the aforesaid process, a succession of glass sheets is conveyed through a tunnel-type furnace. The furnace is divided into a series of zones extending in end-to-end relation along its length. The glass sheets are supported in an upright orientation, preferably by tongs that grip the glass sheets near their upper edges. The tongs are suspended from cars or carriages that are propelled along a track extending the entire length of the furnace and into a further processing station. Heating elements in the form of gas burners or electrical heating coils are arranged in opposed pairs of sets of heating elements to heat the moving glass sheets by irradiation. The heating elements in each zone have their heat input controlled in coordination with the speed of movement of glass sheets through the furnace to help each glass sheet arrive at the press bending station at a temperature sufficiently high for deformation.

At the press bending station, each successive heat-softened glass sheet, still suspended from tongs, is pressed between a pair of shaping members to press bend the sheet to a desired shape, then chilled rapidly to impose a temper on the glass. Subsequently, the bent and tempered glass sheet is released from the tongs and deposited on a peg-type conveyor of the type disclosed in U.S. Pat. No. 3,412,841 to Paul Couch and Richard N. Pytel. The sheet is cooled to handling temperature while supported on the peg-type conveyor.

Each cooled shaped glass sheet is then positioned on an inspection fixture of the type disclosed in U.S. Patent Application Ser. No. 57,576, now Pat. No. 3,733,704, filed on July 23, 1970, in the name of A. W. Farabuaugh and entitled "Method and Apparatus for Determining Contours of Objects, Especially of Glass" to measure the deviation from a reference surface for each of a number of selected points on the glass sheet.

Since the glass sheet remains suspended between the time it is shaped and the time it is rapidly chilled to a temperature at which the glass shape is set, gravity causes the shaped sheet to relax toward a flat shape. Those regions of the press-bent glass sheets that have been heated to too high a temperature will relax toward greater flatness than desired during their cooling from the temperature at which they are shaped to handling temperature. Such regions of the suspended glass sheets become too flat compared to the reference surface indicated by the inspection fixture. The inspection fixture indicates this flatness in a series of deviation values for measured points in said region in which selected ones are expressed in one sense. Those regions of the glass sheets that have not been heated sufficiently resist deformation while suspended during cooling. Such latter regions will appear to be overbent compared to the indication of reference surface on the inspection fixture. The deviation values indicated by the inspection fixture for points in an overbent region includes selected ones expressed in the opposite sense. The operator studies the deviation values and uses his expertise to make adjustments to the heating elements of the furnace and/or change the speed of glass sheet movement through the furnace to reduce the deviation values of glass sheets processed subsequent to the deviation measurements.

In using press bending apparatus of the type described and claimed in U.S. Pat. No. 3,367,764 to Samuel L. Seymour, assigned to PPG Industries, Inc., operators have used the deviation values supplied by said inspection fixture to control the shape of a specific region of the glass sheet by changing the shaping members of the press bending apparatus. When a specific region of the glass sheet has been bent to too shallow a curvature, the operator adjusted the shaping members in their portions that engage said region to make the region of the glass sheet more sharply bent. For a specific region of the glass sheet that has been bent to too sharp a curvature, the operator adjusted the configuration of the shaping members to make the region of the glass sheet less sharply bent. However, the operator studied the deviation values and used his expertise to make adjustments to the shaping members to control deviation of the region of subsequently processed glass sheets without any systematic approach to guide the operator as to the location and the amount of the adjustment needed.

U.S. Patent Application Ser. No. 333,603, filed Feb. 20, 1973, by Jacob R. Peternel, entitled "A Method for Controlling Curvature of Regions in a Shaped Thermoplastic Sheet" discloses a systematic method for determining adjustments to the heating elements of the furnace and/or to the speed of the sheets moving through the furnace to reduce the deviation of glass sheets processed subsequent to the deviation measurements. However, in the prior art there is no teaching of a systematic method of adjusting the shaping members to control the shape of glass sheets.

The previous method of determining adjustments to shaping members to control the shape of glass sheets has several drawbacks, namely, previous adjustments of the shaping members to control the overall contour of the glass sheet were (1) based on a series of point measurements, and (2) relied on the operator's expertise to make adjustments to the shaping members.

The shaping members of a press bending apparatus include a concave shaping surface and a convex shaping surface which oppose one another. The shaping surfaces are urged toward each other about a heat-softened glass sheet to shape the glass sheet. Adjustments to the shaping members and, more particularly, to the shaping surfaces, to optimize the shaping of the glass sheets should be based on data obtained from comparing the curvature of preselected regions with the desired curvature for said regions and not from data obtained from measuring the deviation from a reference surface at selected points of the glass sheet. This is so because a deviation value measured on the inspection fixture at a particular point may result from a departure in shape from a desired configuration in a region spaced a considerable distance from the point where the deviation is measured. Hence, a good guide was lacking to assist an operator to change the shaping surface of a pressing mold to correct a departure from the desired shape of a given sheet.

Another drawback in the previous technique of controlling the shape of the glass sheets is that adjustments to the shaping members were made based on the operator's expertise. A fabrication operation, such as controlling the shape of glass sheets based on an operator's expertise, is inefficient, costly and inconsistent. It is inefficient because the judgement of the operator is subjective rather than objective. It is costly because time and product is lost while an operator obtains his expertise. Furthermore, no two operators have the same expertise and, since different persons operate on different shifts, the operation is inherently inconsistent from shift to shift. In addition, a particular operator may be inconsistent in his jugment from the beginning of a shift when he is relatively fresh to the end of the shift when he is relatively tired. It would therefore be advantageous if a systematic method were available to control the contour of regions of shaped glass sheets that eliminates dependence on operator expertise.

SUMMARY OF THE INVENTION

The present invention comprises a method of controlling to within a desired tolerance the contour of a thermoplastic sheet shaped while heat-softened by press bending apparatus, comprising the steps of determining the radius of curvature of preselected regions of a shaped sheet from the coordinates of at least three points associated with at least one of said preselected regions, comparing each said radius of curvature determined for said preselected regions with the radius of curvature of corresponding regions of a reference surface, selecting a region of said sheet whose radius of curavture so determined differs from the radius of curvature of its corresponding region of said reference surface sufficiently to make adjustment of the radius of curvature of said selected region desirable, determining an adjustment to said press bending apparatus which reduces said difference in radius of curvature of said selected region from that of said corresponding region while simultaneously maintaining the contour of other regions of said sheet to within said desired tolerance, adjusting said press bending apparatus according to said determination, and shaping subsequent sheets by said adjusted press bending apparatus.

In the discussion of illustrative preferred embodiments of the invention, certain terms are used. These terms are now defined to clarify the detailed description.

"Measured deviation value" is the measured distance in linear units between a point on a reference surface and a corresponding point of a shaped thermoplastic sheet, which measured distance is determined from a potentiometer reading obtained from the inspection fixture.

"Calculated deviation value" is a value in linear units calculated for the distance between the point used to measure "measured deviation value" and the corresponding point on the reference surface that produces a radius of curvature for a region of the sheet that bears a desired relation to the radius of curvature of the corresponding region of the reference surface.

"Actual radius of curvature error" is the difference in linear units between the radius of curvature of a region of the sheet as determined by the measured deviation values of at least three points associated with said region and the radius of curvature of a corresponding region of said reference surface.

"Target radius of curvature error" is a desired difference in linear units of radius of curvature of a region of the sheet from the radius of curvature of a corresponding region of the reference surface.

"Measured radius of curvature error" for a region is the difference in linear units between the "target radius of curvature error" for the region and the "actual radius of curvature error" of the region as determined from a set of at least three points for which the "measured deviation value" is determined.

"Calculated radius of curvature error" for a region is the difference in linear units between the "target radius of curvature error" of the region and a radius of curvature of the region determined from a set of points including one compensated for its "measured deviation value" and at least two other points for which the "measured deviation value" is determined.

"Candidate point" is a point on a thermoplastic sheet facing a potentiometer of an inspection fixture, which, when adjusted to provide a region associated with said point with a zero measured radius of curvature error, enables other regions of said sheet to remain within tolerance.

"Ideal candidate point" is a "candidate point" that provides the least total of absolute values of calculated radius of curvature errors for other regions whose calculated radius of curvature errors are affected by said adjustment plus the absolute values of measured radius of curvature errors for those other regions whose measured radius of curvature errors are not affected by said adjustment when adjusted to provide a region primarily associated with said ideal candidate point with a zero measured radius of curvature error.

More specifically, the present invention involves controlling the shape of a press-bent thermoplastic sheet by adjusting the radius of curvature imparted to at least one region of a shaped sheet to a value approximately equal to the radius of curvature of a corresponding region of a reference surface. A measured radius of curvature error is determined for said region and thereafter adjustments to the shaping apparatus are determined such that the measured radius of curvature error of said region of subsequently shaped sheets is approximately zero so that the actual radius of curvature error equals the target radius of curvature error.

Adjustments to the press shaping apparatus based on measured radius of curvature error for one or more regions according to one aspect of the present invention correct the contour of corresponding regions of subsequently bent sheets when said regions of previous sheets are improperly bent. Compensating for deviations of selected measuring points on the sheet to reduce the deviations at the selected points as practiced before the present invention did not necessarily provide control of the shape of the region of the sheet requiring change in contour. Without any control of shape other than at selected points, the task of controlling contour of regions of a sheet to within tight tolerances was almost impossible.

In contrast, the present invention provides a systematic arrangement for controlling adjustment needed for the press bending molds. This invention comprises determining a measured radius of curvature error for each preselected region from measured deviation values of at least three selected points associated with each preselected region. Thereafter, a region of the glass sheet having a relatively large measured radius of curvature error is selected and the portions of the shaping surfaces of the shaping molds facing the selected region are adjusted to reduce the measured radius of curvature error of the corresponding region of subsequently shaped sheets to approximately zero so that the actual radius of curvature error approximates the target radius of curvature error. A calculated deviation value is determined for each of the selected points used to determine the actual radius of curvature in the selected region. The adjustments needed for the shaping surfaces of the shaping molds are calculated at areas on the mold portions facing said selected points so that the contour of the selected region has a measured radius of curvature error of zero in later bent sheets. A determination is then made to assure that a mold adjustment that provides the calculated deviation value at a selected point simultaneously maintains the contour within desired tolerance in other regions of subsequently bent sheets.

One obtains this last determination by determining the calculated radius of curvature from a group of at least three points including the one selected point and adjacent points which may include one or more points from adjacent regions. The selected point of the group that provides other regions of subsequently bent sheets with radii of curvature having total departure from desired curvature within tolerance when said selected point is adjusted to provide a target radius of curvature error in said selected region becomes a candidate point and may become the ideal candidate point, which is used to determine the adjustment to the corresponding region of the press bending apparatus.

While the present invention is suitable for use in shaping any thermoplastic material more precisely, it was originally developed for the production of precisely curved glass sheets.

DETAILED DESCRIPTION OF THE INVENTION

As stated previously, the present invention relates to a method of systematically controlling the shape of thermoplastic sheets, specifically, the radius of curvature of selected regions of a shaped thermoplastic sheet, such as a sheet of glass used for automobile sidelights or backlights. A preferred illustrative embodiment will be described to clarify the nature of the present invention.

Figure 1:
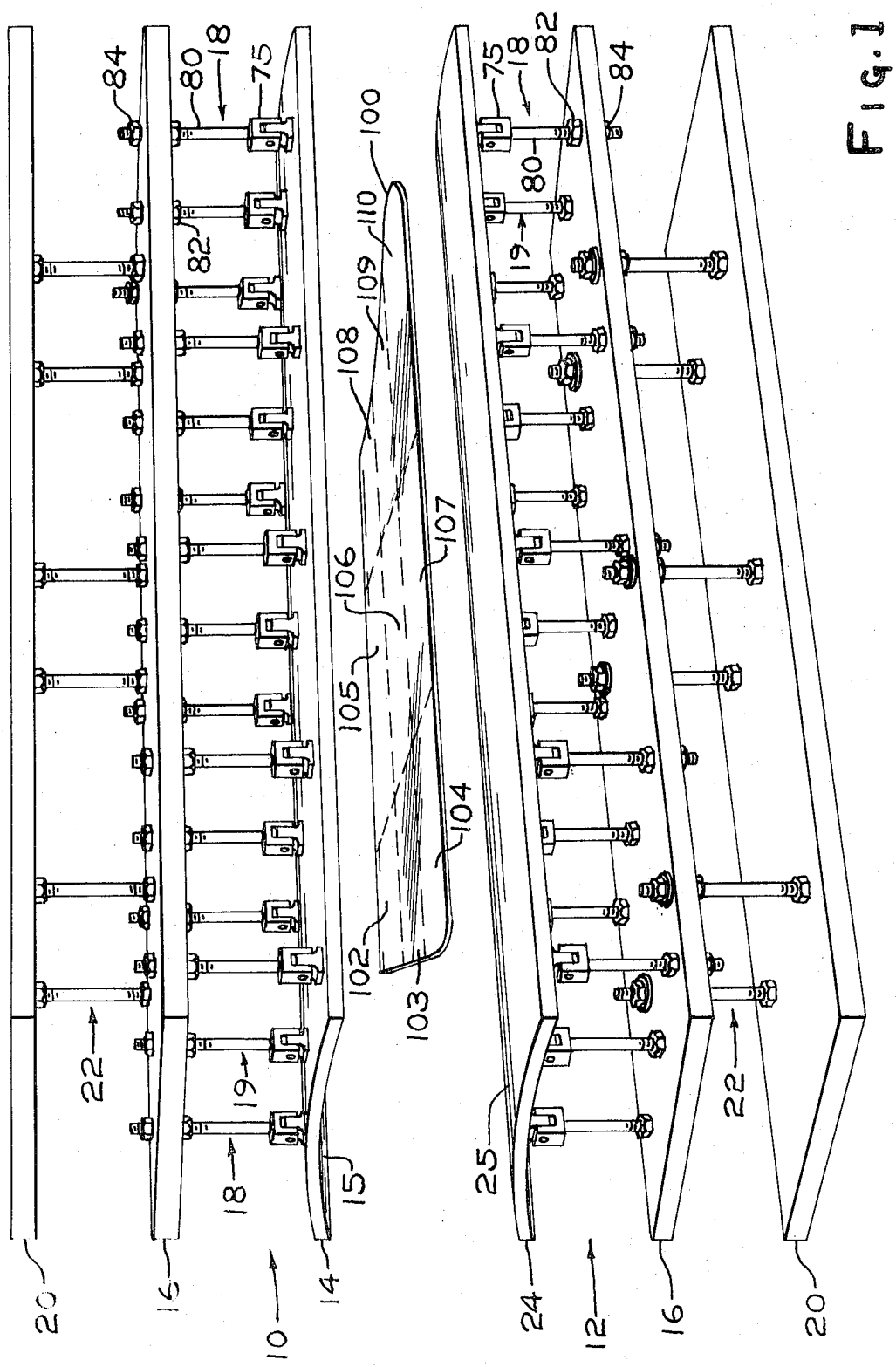
FIG. 1 is an exploded view of a pair of shaping members, one having a convex pressing face, the other having a concave pressing face, showing how the elements are attached to one another to provide the results of the present invention.

A type of press bending apparatus that may be used in the practice of this invention is disclosed in U.S. Pat. No. 3,367,764 to Samuel L. Seymour, assigned to PPG Industries, Inc. FIG. 1 shows a concave shaping member 10 and a convex shaping member 12 of the above-mentioned U.S. Patent. The concave shaping member 10 includes a relatively flexible shaping plate 14 having a concave shaping surface 15 facing forward in one direction. A relatively rigid member in the form of metal plate 16 is disposed in space relation behind the shaping plate 14 by means of a series of attachment means 18 distributed throughout the extent of the plates and additional centrally disposed attachment means 19 to connect plates 14 and 16 to one another in a manner described in the above-mentioned U.S. Patent. A rigid back plate 20 is connected in spaced relation to the rigid metal plate 16 by a plurality of rigid, elongated, adjustable connectors 22.

The convex shaping member 12 includes a relatively flexible shaping plate 24 having a shaping surface 25 complementary to the surface 15 of the concave shaping member 10, a relatively rigid member in the form of another metal plate 16, and attachment means 18 and 19 connecting the relatively rigid metal plate 16 to the rear of and in spaced relation to shaping plate 24. It also includes a rigid back plate 20 and connecting means 22 connecting the rigid back plate to the relatively rigid metal plate 16 associated with the convex shaping member 12 in a manner similar to how the like elements are associated with the concave shaping member 10.

As taught in the above-mentioned U.S. Patent, the attachment means 18 and 19 permit the shaping plates or face plates 14 and 24 to be fabricated to the approximate curve desired. These approximate shapes are then adjustable by locating the attachment means at strategically located positions behind the curved shaping plates or face plates 14 and 24. The attachment means 18 and 19 hold the curved face plates 14 and 24 sufficiently rigid to withstand without deformation the pressure strains arising from pressurized engagement with heat-softened glass sheets during continuous production of bent glass sheets.

The attachment means 18 and 19 include adjustable threaded shafts 80, each having one end secured to the rear of a web 75 and its other end mounted through an aperture of the rigid plate 16 with lock nuts 82 and 84 disposed on the opposite sides of the relatively rigid plate 16. By adjusting the location of the lock nuts 82 and 84 along the shaft 80, stresses are established in the relatively flexible metal shaping plates 14 and 24 to adjust their respective shaping faces 15 and 25 locally to the shape desired for the glass to be bent. Each threaded shaft 80 has a pitch equal to that of every other threaded shaft so that the same degree of turning of each pair of lock nuts 82 and 84 on one shaft 80 has the same effect on altering the shaping surface configuration as an equal amount of turning relative to every other shaft.

FIG. 1 shows a heat-softened sheet of glass 100 advantageously divided into 9 regions, namely, 102 through 110. Each of the regions corresponds to an area of the shaping surfaces 15 and 25 and to a set of attachment means 18 or 19 which shape the corresponding region of the sheet of glass to a desired bend.

The heat-softened sheet of glass 100 is shaped in the manner taught in the above-mentioned U.S. Patent to Seymour. After the shaped sheet of glass 100 cools, the steps of the invention are practiced to reduce or control the radius of curvature error of regions of subsequently shaped sheets of glass.

The first step in the preferred method of the present invention is to determine a measured radius of curvature error for each region 102 through 110 of a shaped sheet of glass 100 which is heat-softened and shaped to a desired contour between the concave and convex shaping members 10 and 12, respectively, in the manner described in the above-mentioned U.S. Patent.

There are several different methods to determine the measured radius of curvature error for regions of the glass sheet. An inspection fixture and procedure which has proven satisfactory will be described.

Figure 2:
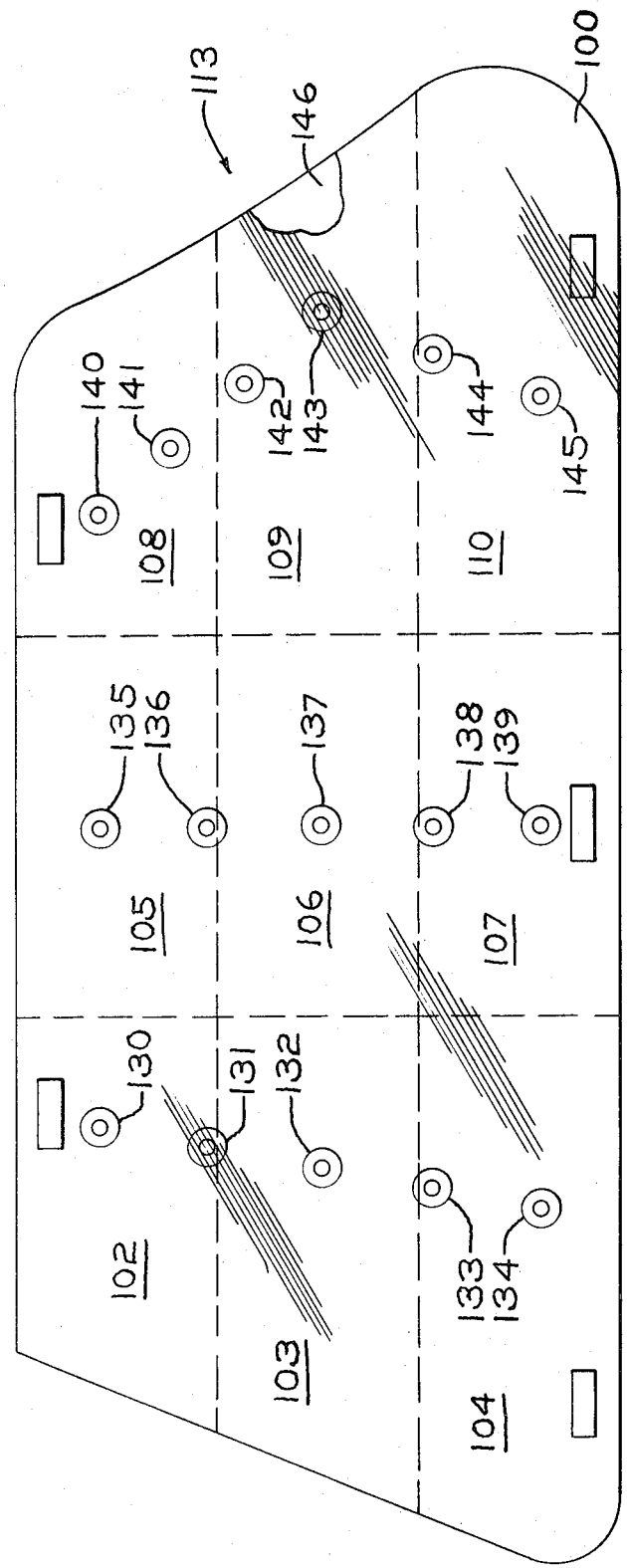
FIG. 2 is a front elevational view of an inspection fixture that may be used to practice the method of this invention.

Referring to FIG. 2, an inspection fixture 113 has a plurality of linear potentiometers 130–143, each mounted on a support 146 in a manner disclosed in U.S. Patent Application Ser. No. 57,576, filed on July 23, 1970, in the name of A. W. Farabaugh and entitled "Method and Apparatus for Determining Contours of Objects, Especially of Glass." The above-mentioned U.S. Patent Application illustrates potentiometers mounted on the perimeter of a frame-type support, whereas in FIG. 2 of this application, the potentiometers are selectively mounted throughout the extent of the support. However, the manner of mounting and operating the linear potentiometers are as discussed in U.S. Patent Application Ser. No. 57,576 now Pat. No. 3,733,704 to Farabaugh.

As shown in FIG. 2, the potentiometers are arranged to define four groups of potentiometers, namely, Group I including potentiometers 130 to 134, Group II including potentiometers 135 to 139, Group III including potentiometers 140 to 143, and Group IV including potentiometers 143 to 145. The potentiometers in each group are arranged in a straight line and adjacent potentiometers in any group are spaced equal distances from each other.

The potentiometers need not be in a straight line. However, it has been found that when the potentiometers of each group are not in a straight line, any variation in the orientation of the glass sheet on the fixture due to pivoting of the glass relative to the inspection fixture about an axis causes changes in the potentiometer readings, which changes will result in an inaccurate determination of actual radius of curvature error. This inaccurate calculation is avoided when the potentiometers in a given group are linearly aligned, because the changes in individual readings compensate one another along a straight line. Also, the potentiometers in a group need not be spaced equidistant from each other. However, spacing the poteniometers in a group equidistant from each other facilitates the practice of the invention. In addition, the number of groups of potentiometers is arbitrary and depends on the size and shape of the sheets being produced. For a sheet of glass shaped as shown in FIG. 2, four groups of potentiometers arranged as shown in FIG. 2 has proven satisfactory.

As shown in FIG. 2, the groups of potentiometers are arranged in non-parallel relationship to each other and to the axis or axes of curvature, as the case may be. This arrangement permits simultaneous determination of actual radius of curvature error of a region relative to longitudinal and lateral axes of bend of a sheet having a compound bend. When the groups of potentiometers are arranged parallel to an axis of bend, two determinations are required to ascertain deviation of a region from a reference surface having a compound bend, namely, an actual radius of curvature error determination relative to the longitudinal axis and an actual radius of curvature error determination relative to the lateral axis. Although the method of this invention is applicable to those situations where the groups of potentiometers are arranged in arrays non-parallel or parallel to each other, the discussion of the invention will be directed to an inspection fixture having the groups of potentiometers arranged in non-parallel arrays.

The inspection fixture 113 is divided into nine regions 102 through 110, which correspond to regions 102 through 110 of the glass sheet 100, which in turn correspond to areas of the shaping surfaces 15 and 25 and to attachment means 18 and 19 of the shaping members 10 and 12 (see FIG. 1).

Each region of the inspection fixture has associated with it three potentiometers. The potentiometers face different points associated with the selected glass sheet region to provide a measured deviation value for each respective point. The measured deviation values are used in the calculation of actual radius of curvature error for the selected region of the glass sheet. Table I correlates the group of potentiometers with the potentiometers associated with the regions of the sheet of glass 100 or of the inspection fixture 113.

TABLE I orrelation of group of potentiometers with the potentiometers associated th the regions of the sheet of glass 100 or of the inspection fixture 113

| Group of potentiometers | Regions of the sheet of glass or of the inspection fixture | Potentiometers associated with the regions of the sheet of glass or of the inspection fixture |
|---|---|---|
| I | 102 | 130, 131, 132 |
|  | 103 | 131, 132, 133 |
|  | 104 | 132, 133, 134 |
| II | 105 | 135, 136, 137 |
|  | 106 | 136, 137, 138 |
|  | 107 | 137, 138, 139 |
| III | 108 | 140, 141, 142 |
|  | 109 | 141, 142, 143 |
| IV | 110 | 143, 144, 145 |

The inspection fixture 113 and shaping surfaces 15 and 25 are arbitrarily divided into nine regions and nine areas, respectively, and the inspection fixture and shaping surfaces may be divided into more or less corresponding regions or areas, respectively, depending on the size and shape of sheets produced. Also, there should be at least three potentiometers associated with a region because a minimum of three points are required to determine a radius of curvature. Furthermore, it is recommended that at least one potentiometer associated with one region also be associated with at least one adjacent region. In this manner, the change of curvature of another region resulting from changing the radius of curvature of a given region can be determined.

Referring now to FIG. 2, the inspection fixture 113 is preferably prepared to provide measured deviation values of potentiometers needed in the calculation of actual radius of curvature error of each preselected region of the sheet by positioning a master shaped sheet (not shown) onto the inspection fixture 113 to provide a reference surface, or adjusting each of the potentiometers 130–145 to said reference surface as described in the hereinabove mentioned U.S. Patent Application Ser. No. 57,576 of A. W. Farabaugh. The bent sheet of glass whose shape is to be checked for conformance to the master shape is then positioned on the inspection fixture and potentiometer readings from each of the potentiometers 130–145 are recorded to determine the deviation of the shaped sheet from the reference surface at each point of the glass sheet facing a corresponding potentiometer.

A measured radius of curvature error for each region of the shaped contoured sheet is determined by subtracting the target radius of curvature error ($TRCE_R$) from the actual radius of curvature error ($ARCE_R$). One way this can be determined is from equation 1, which reads:

1.
$$MRCE_R = -2\left[\frac{(d_{1-R}-d_{2-R})X_{2-R}}{X_{1-R}+X_{2-R}} + \frac{(d_{3-R}-d_{2-R})X_{1-R}}{X_{1-R}+X_{2-R}}\right]\left[\frac{DRC_R}{X_{1-R}}\right]^2 - TRCE_R$$

where $MRCE_R$ is measured radius of curvature error in inches for a given region of the shaped contoured sheet associated with the region on the inspection fixture, such as region 103;

the term:

$$-2\left[\frac{(d_{1-R}-d_{2-R})X_{2-R}}{X_{1-R}+X_{2-R}} + \frac{(d_{3-R}-d_{2-R})X_{1-R}}{X_{1-R}+X_{2-R}}\right]\left[\frac{DRC_R}{X_{1-R}}\right]^2$$

is the actual radius of curvature error in inches for said region;

$d_{1-R}$ is the measured deviation value in inches from the reference surface determined by a first potentiometer in the given region, such as potentiometer 131;

$d_{2-R}$ is the measured deviation value in inches from the reference surface determined by a second potentiometer adjacent to the first potentiometer, such as potentiometer 132, in the given region;

$d_{3-R}$ is the measured deviation value in inches from the reference surface determined by a third potentiometer adjacent to the second potentiometer, such as potentiometer 133, in the given region;

$X_{1-R}$ is the distance in inches between measuring points on the reference surface as indicated by the distance between the potentiometers 131 and 132;

$X_{2-R}$ is the distance in inches between measuring points on the reference surface as indicated by the distance between the potentiometers 132 and 133;

$DRC_R$ is the radius of curvature of the reference surface in inches for the given region, such as region 103; and $TRCE_R$ is the target radius of curvature error in inches for the given region of the shaped contoured sheet, such as region 103.

When $X_{1-R}$ equals $X_{2-R}$, equation I becomes equation 2, which follows:

2.
$$MRCE_R = -\frac{1}{X_R^2}[DRC_R]^2[d_{1-R} - 2d_{2-R} + d_{3-R}] - TRCE_R$$

where $X_R$ is the distance between adjacent points on the reference surface for the given region, namely, the distance between potentiometers 131 and 132 or 132 and 133.

The target radius of curvature error for a region of the shaped sheet ($TRCE_R$) is a desired radius of curvature error for the region. The value of $TRCE_R$ is selected depending on the desired radius of curvature deviation of the region of the shaped sheet from the corresponding region of the reference surface.

Although it may be desirable to have a $TRCE_R$ of zero, i.e., where the actual radius of curvature of the region of a subsequently shaped sheet is equal to the radius of curvature of the corresponding region of the reference surface, it is within the contemplation of the present invention to have a target radius of curvature error of a value other than zero. In those instances, when the region of the sheet is to be overbent relative to the reference surface, $TRCE_R$ has a negative value and when the region is to be underbent, $TRCE_R$ has a positive value.

Referring to equation 2, the term:

$$-\frac{1}{X_R{}^2}[DRC_R]^2[d_{1-R} - 2d_{2-R} + d_{3-R}]$$

is the actual deviation of the radius of curvature of the region of the shaped sheet from the corresponding region of the reference surface, or "actual radius of curvature error."

The next step in the preferred method of the invention is to determine the measured radius of curvature error of regions 102–110 of the sheet using equation 2 and the measured deviation values determined from the potentiometers. As can be seen in FIG. 2, and shown in Table I, the measured deviation values determined from potentiometers 143, 144 and 145 can be used to determine measured radius of curvature error of region 110, measured deviation values determined from potentiometers 141, 142 and 143 can be used to determine measured radius of curvature error of region 109, and measured deviation values determined from potentiometers 140, 141 and 142 can be used to determine measured radius of curvature error of region 108, and other measured radius of curvature errors can be determined for the remaining regions using the measured deviation values determined from the potentiometers listed according to Table I.

After the measured radius of curvature error for each region is determined from equation 2, the region having the largest absolute value of measured radius of curvature error, i.e., $/MRCE_R/$, is selected for subsequent steps. Absolute value of measured radius of curvature error is preferably used because it is desired to reduce the magnitude of the error regardless of its direction.

The method of this invention that will be described involves reducing the measured radius of curvature error in the region having the largest absolute value of measured radius of curvature error to zero. However, it is not intended to limit the invention thereto. For example, any region may be selected to be corrected and the following steps would be applicable thereto to reduce the measured radius of curvature error in the selected region sufficiently to meet tolerance requirements or to eliminate same entirely.

For clarity of discussion, it is assumed that region 103 of the shaped sheet of glass (see FIGS. 1 and 2) has the largest absolute value of measured radius of curvature error.

Referring to Table I, the measured radius of curvature error for region 103 is determined from the measured deviation values determined from potentiometers 131 ($d_{1-103}$), 132 ($d_{2-103}$) and 133 ($d_{3-103}$) and the calculations based on equation 2 using a desired value for target radius of curvature error for said region. The next step is to set the measured radius of curvature error to zero and to determine a deviation value for potentiometer 131, hereinafter referred to as a calculated deviation value for potentiometer 131, that makes the measured radius of curvature error of region 103 zero. Stated another way, a calculated deviation value for potentiometer 131 is determined that makes the actual deviation of radius of curvature of the region of the shaped sheet from that of the corresponding region of the reference surface equal to the target radius of curvature error. This is accomplished by setting equation 2 equal to zero, transposing $TRCE_R$ to the other side of the equal sign, and solving for a calculated deviation value for potentiometer 131, the measured deviation values determined by the respective potentiometers 132 and 133 remaining unchanged.

As will be noted from Table I, the measured deviation value determined from potentiometer 131 is also used to calculate the measured radius of curvature error of region 102. The effect on the radius of curvature of region 102 that results from changing the measured deviation value determined by the potentiometer 131 to a calculated deviation value to give a zero measured radius of curvature error to region 103 is also determined. This is to determine whether the calculated deviation value calculated for potentiometer 131, which becomes the measured deviation value determined by potentiometer 131 of subsequently bent sheets, increases the measured radius of curvature error in region 102 of subsequently bent sheets.

The effect of changing the measured deviation value determined from potentiometer 131 to a calculated deviation value on the radius of curvature of region 102 is determined by equation 2 using the calculated deviation value calculated for potentiometer 131 and the measured deviation values determined from potentiometers 130 and 132 and the target radius of curvature error for region 102. In this instance, $d_{1-102}$ is the measured deviation value determined from potentiometer 130, $d_{2-102}$ is the calculated deviation value calculated for potentiometer 131 and $d_{3-102}$ is the measured deviation value determined from potentiometer 132. Equation 2 now gives a calculated radius of curvature error for region 102 based on modifying the deviation value associated with potentiometer 131.

A comparison is made between the absolute values of the measured radius of curvature error for region 102, i.e., $/MRCE_{102}/$, and the calculated radius of curvature error for region 102, i.e., $/CRCE_{102}/$. If the absolute value of the calculated radius of curvature error for region 102 is equal to or less than the absolute value of the measured radius of curvature error of region 102 or is not so great as to exceed customer tolerances for actual radius of curvature error even if the calculated radius of curvature error exceeds the measured radius of curvature error for region 102, the point on the sheet adjusted to provide the calculated deviation value for the potentiometer 131 becomes a candidate point for subsequent steps to be described. If the absolute value of the calculated radius of curvature error is greater than the absolute value of the measured radius of curvature error and if it exceeds customer tolerances, the point on the sheet adjusted to provide the calculated deviation value for the potentiometer 131 cannot become a candidate point and is disregarded. This is because the calculated deviation value calculated for potentiometer 131, if used, becomes a measured deviation value determined from potentiometer 131 for subsequent bent sheets and the absolute value of the measured radius of curvature error of region 102 of subsequent bent sheets would be unacceptable.

The next step in the preferred process is to calculate a calculated deviation value for the point facing potentiometer 132 in region 103 that gives region 103 a measured radius of curvature error of zero. Equation 2 as before is set to zero and a calculated deviation value is calculated for the point facing potentiometer 132 ($d_{2-103}$) to give region 103 a measured radius of curvature error of zero. Values expressed by potentiometers 131 ($d_{1-103}$) and 133 ($d_{3-103}$) are the measured deviation values determined by the respective potentiometers 131 and 133. As will be noted, in Table I the measured deviation value determined by potentiometer 132 is also used in determining the measured radius of curvature error of regions 102 and 104. Therefore, calculated radius of curvature errors for regions 102 and 104, i.e., $CRCE_{102}$ and $CRCE_{104}$, respectively, are determined to ascertain what effect the calculated deviation value calculated for potentiometer 132 has on future measured radius of curvature errors of regions 102 and 104. Equation 2 is used to determine calculated radius of curvature error for region 102 using the calculated deviation value calculated for potentiometer 132 ($d_{3-102}$); the measured deviation values determined by the potentiometers 130 ($d_{1-102}$) and 131 ($d_{2-102}$) and the target radius of curvature error for region 102 (TRCE$_{102}$). Equation 2 is also used to determine calculated radius of curvature error for region 104 using the calculated deviation value calculated for potentiometer 132 ($d_{1-104}$); the measured deviation values determined by the potentiometers 133 ($d_{2-104}$) and 134 ($d_{3-104}$) and the target radius of curvature error for region 104 (TRCE$_{104}$). The absolute value of the measured radius of curvature error for regions 102 and 104, i.e., /MRCE$_{102}$/ and /MRCE$_{104}$/, respectively, is compared to the absolute value of the calculated radius of curvature error for regions 102 and 104, respectively, i.e., /CRCE$_{102}$/ and /CRCE$_{104}$/, respectively, to determine if the point on the sheet adjusted to provide the calculated deviation value for potentiometer 132 is a candidate point. In this instance, because the point on the sheet for which the calculated deviation value was calculated operates on two other regions, namely, regions 102 and 104, the point on the sheet adjusted to provide the calculated deviation value for potentiometer 132 is considered a candidate point only if the absolute value of the calculated radius of curvature errors of regions 102 and 104 is equal to or less than the absolute value of the measured radius of curvature errors for regions 102 and 104, respectively, or neither absolute value of calculated radius of curvature error of regions 102 or 104 is so great as to exceed customer tolerances for said actual radius of curvature error even if the calculated radius of curvature error or errors exceed the respective measured radius of curvature error or errors of said regions 102 and/or 104.

The next step in the preferred method is to use equation 2 to calculate a calculated deviation value for potentiometer 133 ($d_{3-103}$) that makes the measured radius of curvature error of region 103 zero. In this instance, the values expressed by potentiometers 131 ($d_{1-103}$) and 132 ($d_{2-103}$) are the measured deviation values determined by the respective potentiometers 131 and 132. As will be noted from Table I, the measured deviation value determined by potentiometer 133 was also used in determining the measured radius of curvature error of region 104. Therefore, a calculated radius of curvature error for region 104, i.e., /CRCE$_{104}$/, is determined using the calculated deviation value calculated for potentiometer 133 ($d_{2-104}$); the measured deviation values determined by potentiometers 132 ($d_{1-104}$) and 134 ($d_{3-104}$) and the target radius of curvature error for region 104 (TRCE$_{104}$).

The absolute value of the calculated radius of curvature error for region 104, i.e., /CRCE$_{104}$/, is compared to the absolute value of the measured radius of curvature error for region 104, i.e., /MRCE$_{104}$/. As before, the same criteria are used to determine if the point on the sheet adjusted to provide the calculated deviation value for potentiometer 133 is a candidate point. More particularly, if the absolute value of the calculated radius of curvature error of region 104 is equal to or less than the absolute value of the measured radius of curvature error of region 104, or the absolute value of the calculated radius of curvature error of region 104 is not so great as to exceed customer tolerances for said actual radius of curvature error even if the calculated radius of curvature error exceeds the measured radius of curvature error for region 104, the point on the sheet adjusted to provide the calculated deviation value for the potentiometer 133 is a candidate point.

The next step in the preferred method of this invention is to select an ideal candidate point, i.e., the candidate point that operates to give region 103 a zero measured radius of curvature error and the radius of curvature error equal to the target radius of curvature error while minimizing the measured radius of curvature error of the other regions of the sheet.

The ideal candidate point is selected from the candidate points by summing the absolute value of the calculated radius of curvature error of the region or regions having the candidate point under consideration, i.e., /CRCE$_R$/, and the absolute value of the measured radius of curvature error of the remaining regions, i.e., /MRCE$_R$/. The measured radius of curvature error of region 103 has been set to zero and therefore need not be included in the calculation. The candidate point giving the lowest sum is the ideal candidate point. In an example, and assuming the point on the sheet adjusted to provide the calculated deviation value for potentiometers 131 and 132 are candidate points, the ideal candidate point may be determined by comparing equations 3 and 4, respectively, for evaluating candidate points corresponding to respective potentiometers 131 and 132.

3. $= /CRCE_{102}/ + /MRCE_{104}/ + /MRCE_{105}/ +$
$/MRCE_{106}/ + /MRCE_{107}/$
$+ /MRCE_{108}/ + /MRCE_{109}/ + /MRCE_{110}/.$ where the calculated deviation value calculated for the candidate point corresponding to potentiometer 131 is used to determine the calculated radius of curvature error of region 102, and region 103 has a zero measured radius of curvature error.

4. $= /CRCE_{102}/ + /CRCE_{104}/ + /MRCE_{105}/$
$+ /MRCE_{106}/ + /MRCE_{107}/$
$+ MRCE/_{108}/ + /MRCE_{109}/ + /MRCE_{110}/.$ where the calculated deviation value calculated for the candidate point corresponding to potentiometer 132 is used in determining calculated radius of curvature errors of regions 102 and 104, and region 103 has a zero measured radius of curvature error.

The candidate point giving the lowest sum is the ideal candidate point because the calculated radius of curvature error for region 102 and 104 becomes measured radius of curvature error of regions 102 and 104, respectively, of subsequent bent sheets and the measured radius of curvature error of region 103 of the subsequent bent sheets is approximately zero, and therefore the sum of the absolute value of measured radius of curvature error of the subsequently shaped sheet is minimized. For region 103 of subsequently bent sheets, the measured radius of curvature error will be approximately zero, or, stated another way, the deviation of curvature of region 103 of subsequent bent sheets from the reference surface will be approximately the target radius of curvature error for region 103.

It is recommended that the ideal candidate point be determined by summing the absolute values of the calculated and measured radius of curvature errors of regions because summing their actual positive or negative values may give erroneous results. More particularly, some regions will be overbent and some regions underbent as indicated by a negative or positive sign, respectively. The positive and negative signs tend to cancel out or reduce the measured radius of curvature error values and give a false indication of an ideal candidate point. Using absolute values overcomes the tendency of positive and negative signs to give such false indication.

As can be appreciated by those skilled in the art, applicable steps of this method may be programmed on a computer to accelerate the determination of the ideal candidate point.

After the ideal candidate point has been determined, one or more areas of the shaping surfaces 15 and 25 of shaping plates 14 and 24, respectively, corresponding to portions of the shaping surfaces that face glass sheet regions requiring correction in shape, are adjusted in a manner described in U.S. Pat. No. 3,367,764 to Seymour, so that corresponding regions of subsequently shaped sheets will have approximately the target radius of curvature error or a measured radius of curvature error of zero.

Referring to FIG. 1, lock nuts 82 and 84 mounted on an externally threaded shaft 80 associated with the region having a large, and preferably the largest, absolute measured radius of curvature error, e.g. region 103 in our example, and associated with the ideal candidate point on the sheet, are adjusted to provide the calculated deviation value selected for the ideal candidate point. The lock nuts 82 and 84 are adjusted along the externally threaded shaft 80 a selected amount so that region 103 of subsequently shaped sheets will have a radius of curvature error which is approximately the target radius of curvature error.

To facilitate the adjustment of the shaping surfaces 15 and 25, it may be desirable to provide for each potentiometer of the inspection fixture a corresponding threaded shaft on each of the concave and convex shaping plates. Further, each unit of the potentiometer reading may correspond to one complete turn of the corresponding lock nuts 82 and 84. Thus, depending on the adjustment needed in the region having the ideal candidate point, the lock nuts 82 and 84 of the concave and convex shaping plates are turned an equal number of degrees to provide the needed deviations in shaping surface portions corresponding to the change in deviation value of the ideal candidate point. For an ideal candidate point adjusted according to a positive calculated deviation value, the lock nuts 82 and 84 are turned in one direction and for an ideal candidate point adjusted according to a negative value, the lock nuts 82 and 94 are turned in an opposite direction.

In a typical example, however, a point on the sheet is associated with one potentiometer of the inspection fixture 113 (see FIG. 2) but with several adjustment means 18 and/or 19 of the concave and convex shaping members 10 and 12, respectively (see FIG. 1).

Normally, the groups of potentiometers are arranged to have corresponding potentiometers of adjacent groups spaced between 6 inches and 10 inches apart. The potentiometers in each of the groups are spaced approximately between 4 and 5 inches apart.

The adjustment means of the shaping surfaces 15 and 25 are spaced approximately on two to three inch centers. Each threaded shaft has 13 threads per inch, and one unit of a potentiometer reading corresponds to one flat which is a 60° turn of each lock nut 82 or 84. A turn of one flat deforms the shaping surfaces 15 and 25 associated with the adjustment means so adjusted by approximately ⅛ inch (or approximately 0.013 inch).

The adjustment means 18 or 19 that is adjusted is that adjustment means that is the closest to the point on the sheet that is the ideal candidate point. The number of flats the lock nuts are turned is equal to the units of the calculated deviation value calculated for the ideal candidate point. The direction of turn is dependent on the sign, e.g. for a negative sign the lock nuts would be turned in one sense and for a positive sign, the lock nuts would be turned in the opposite sense.

After press bending molds are adjusted in the manner described previously, glass sheets are shaped using the adjusted press bending apparatus and shaped sheets are measured for measured deviation values on the inspection fixture. If the shaped sheets meet customer requirements, they are packed and shipped. If not, the process is repeated until glass sheets are shaped to their desired contour.

The steps of the process were described in terms of an example of the method of this invention and are not intended to limit the invention. For example, instead of operating on the region having the largest absolute measured radius or curvature error, it may be desirable to select another region. Further, it is within the contemplation of this invention to calculate an ideal candidate point associated with more than one group of potentiometers, and even one for all the groups.

After the press bending molds are adjusted, the method may be practiced on subsequently formed sheets on a programmed schedule or on a random basis.

By practicing the method of this invention, it is now possible to systematically control the contour of shaped sheets of glass without depending upon the subjective judgment of different operators.

The form of this invention shown and described in this disclosure represents an illustrative preferred embodiment thereof. It is understood that various changes may be made without departing from the gist of the invention as defined in the claimed subject matter which follows. For example, the illustrative embodiment described previously is based on an adjustment of opposing shaping surfaces of complementary press bending molds in an area of the molds that corresponds to the location of the ideal candidate point of a selected region of a shaped thermoplastic sheet. However, the term "adjustment" as used herein is not necessarily limited to the adjustment of a single point in a single area of each press bending mold or of more than one point in said area. Furthermore, the present invention contemplates the possibility of basing the adjustment of the shaping surfaces on the simultaneous adjustment of more than one area of the shaping surfaces of the press bending molds in one or more regions based on the simultaneous selection of two or more ideal candidate points rather than the sequential adjustment of individual areas each based on a separate selection of an ideal candidate point. However, practical experience on a commercial line for press bending glass sheets shows that one or two sequential adjustments of press bending molds based on independent seelction of a single ideal candidate point for each adjustment usually suffice to obtain the desired result of shaping glass sheets to tolerance on a mass-production basis.

What is claimed is:

1. A method of controlling to within a desired tolerance the contour of a thermoplastic sheet shaped while heat-softened by press bending apparatus, comprising the steps of:

determining a radius of curvature for preselected regions of a shaped sheet from the coordinates of at least three points associated with at least one of said preselected regions, establishing a reference radius of curvature for corresponding preselected regions and points associated with a reference surface;

comparing each said radius of curvature determined for said preselected regions with the radius of curvature established for corresponding regions of said reference surface, selecting a region of said sheet whose radius of curvature so determined differs from the radius of curvature established for its corresponding region of said reference surface sufficiently to make adjustment of the radius of curvature of said selected region desirable, determining an adjustment to said press being apparatus which reduces the difference in radius of curvature for said selected region from that established for said corresponding region while simultaneously maintaining the contour of other regions of said sheet to within said desired tolerance, adjusting said press bending apparatus according to said determination, and shaping subsequent sheets by said adjusted press bending apparatus.

2. The method as in Claim 1, wherein said press bending apparatus is adjusted to reduce the difference in radius of curvature for said selected region from that for said corresponding region to zero.

3. The method as in Claim 1, wherein a series of thermoplastic sheets are shaped by press bending, at least one of said series of sheets is shaped by press bending prior to said adjusting step and other sheets of said series are shaped by press bending after said adjusting step.

4. The method as in Claim 3, wherein at least one of said other shaped sheets, after said shaping by said adjusted press bending apparatus, is subjected to the steps of:
  determining a radius of curvature for preselected regions thereof from the coordinates of at least three points associated with at least one of said preselected regions,
  comparing each said radius of curvature determined for said preselected regions with the radius of curvature established for corresponding regions of said reference surface,
  selecting a region of said press-bent sheet whose radius of curvature so determined differs from the radius of curvature established for its corresponding region of said reference surface sufficiently to make adjustment of the radius of curvature for said selected region desirable,
  determining another adjustment to said press bending apparatus which reduces said difference in radius of curvature for said selected region from that established for said corresponding region while simultaneously maintaining the contour of other regions of said sheet to within said desired tolerance,
  readjusting said press bending apparatus according to said other determination, and
  shaping subsequent sheets by said readjusted press bending apparatus.

5. A method of controlling to within desired tolerance the contour of a thermoplastic sheet shaped by press shaping apparatus having adjustable shaping surfaces while said sheet is heat-softened, by reducing an actual radius of curvature error for at least one region of said sheet to a target radius of curvature error, comprising the steps of:
  establishing a reference surface having a desired radius of curvature for at least one region thereof;
  determining a measured radius of curvature error for at least three points associated with at least one region of said sheet corresponding to said at least one region of said reference surface,
  determining an adjustment to the shaping apparatus such that a measured radius of curvature error for three corresponding points of a corresponding region of a subsequently shaped sheet is approximately zero and the radius of curvature error determined for other region of said subsequent sheet is maintained to within said desired tolerance,
  adjusting said shaping apparatus according to said adjustments so determined, and
  shaping said subsequent sheet by said adjusted press bending apparatus.

6. The method as set forth in Claim 5, wherein said sheet is sandwiched between a pair of shaping plates of said press bending apparatus during said shaping, including the step of:
  adjusting the shape of selected portions of said shaping plates of the press bending apparatus corresponding to said one region of the shaped sheet to shape said one region of the subsequently shaped sheets to so that said three points define a radius of curvature having approximately the target radius of curvature error.

7. The method as set forth in Claim 5, wherein said step of determining adjustments to the press bending apparatus comprises:
  determining a calculated deviation value for at least one point in said one region of the shaped sheet such that the measured radius of curvature error of said one region becomes approximately zero and the radius of curvature for said region of subsequently shaped sheets has approximately the target radius of curvature error.

8. A method of controlling radius of curvature of a shaped thermoplastic sheet wherein a heat-softened thermoplastic sheet is shaped in a press bending apparatus, having adjustable shaping surfaces comprising the steps of:
  establishing a reference surface for said shaped sheet;
  determining measured deviation values from said reference surface of selected points in a first region and a second region of the shaped sheet wherein the first and second regions are adjacent to one another,
  determining from said measured deviation values a measured radius of curvature error for said first region and a measured radius of curvature error for said second region of the shaped sheet respectively,
  establishing a target radius of curvature error for each of said first and second regions,
  determining a calculated deviation value for each of said selected points of said first region that will make the measured radius of curvature error for said first region approximately zero and approximately equal to the target radius of curvature error,
  determining candidate points from the calculated deviation value for each of the selected points of the first region wherein the candidate point is a selected point having a calculated deviation value that gives the first region the target radius of curvature error while maintaining the absolute value of the calculated radius of curvature error of the second region equal to or less than the absolute value of the measured radius of curvature error of the second region or while maintaining said second region within desired tolerance, and
  adjusting said press shaping apparatus in a portion corresponding to one of said candidate points an amount corresponding to said calculated deviation value for said canditate point.

9. The method as set forth in Claim 8, further including the steps of:
  determining an ideal candidate point from said candidate points, wherein the ideal candidate point is a candidate point whose calculated deviation value provides the lowest absolute value for the calculated radius of curvature error of the second region of those provided by said candidate points, and
  adjusting said press shaping apparatus in a portion corresponding to said ideal candidate point an amount corresponding to said calculated deviation value.

10. The method as set forth in Claim 8, further including the step of:
  adjusting portions of shaping surfaces of the press bending apparatus corresponding to the first region such that the first region of subsequent shaped sheets has a measured radius of curvature error of approximately zero and the radius of curvature error of the subsequent sheets is approximately the target radius of curvature error.

11. A method of minimizing radius of curvature error of shaped thermoplastic sheets, wherein a heat-softened thermoplastic sheet is shaped by a press bending apparatus having an adjustable shaping surface, comprising the steps of:
  (1) determining the measured deviation values from a reference surface of at least three selected points in each of a plurality of regions, each of said regions corresponding to an area of opposed shaping surfaces of a press bending apparatus,
  (2) determining a measured radius of curvature error for each of the plurality of regions from the measured deviation values of said selected points compared to the radii of curvature for corresponding regions of said reference surface,
  (3) determining a calculated deviation value for each of the selected points of the region having the largest absolute value of measured radius of curvature error that gives the region a target radius of curvature error,
  (4) determining at least one candidate point from the calculated deviation values of said selected points wherein the candidate point is a selected point having a calculated deviation value of a point in the region that gives the region the target radius of curvature error while the absolute value of the measured radius of curvature error of each of the remaining regions affected by an adjustment to said press bending apparatus in a portion corresponding to said region in an amount equivalent to said calculated deviation value becomes equal to or less than its absolute value of measured radius of curvature error or is within the desired tolerance as a consequence of said adjustment, (5) determining an ideal candidate point from the candidates, and (6) adjusting the shaping surface of the press bending apparatus in a portion corresponding to said region to shape corresponding regions of subsequent sheets such that the measured radius of curvature error of the corresponding regions of subsequent sheets is approximately zero and the actual radius of curvature error of said region is approximately the target radius of curvature error.

12. The method as in Claim 11, wherein said steps are performed on subsequently shaped sheets.

13. In a method of shaping thermoplastic sheets comprising applying heat to a sheet to soften said sheet; shaping the heat-softened sheet to a desired shape on a mold having an adjustable surface, and thereafter measuring the deviation of said sheet from a reference surface at selected points on the shaped sheet, the improvement comprising:

establishing a desired radius of curvature defined by at least three of said selected points related to at least one predetermined region of said reference surface;

determining a measured radius of curvature defined by corresponding selected points related to a corresponding predetermined region of the shaped sheet;

determining the error of the radius of curvature defined by said selected points of said shaped sheet, the said error being the difference between the determined radius of curvature and the desired radius of curvature for said selected points; and adjusting said mold by an amount sufficient to reduce said error by reducing the difference between determined radius of curvature and the desired radius of curvature for corresponding selected points related to corresponding predetermined regions of subsequently shaped sheets.

References Cited
UNITED STATES PATENTS

| | | | |
|---|---|---|---|
| 3,367,764 | 2/1968 | Seymour | 65—273 X |
| 2,239,546 | 4/1941 | Black et al. | 65—106 |

ARTHUR D. KELLOGG, Primary Examiner

U.S. Cl. X.R.

65—107; 33—1 BB, 174 PB

UNITED STATES PATENT OFFICE
CERTIFICATE OF CORRECTION

Patent No. 3,846,105    Dated November 5, 1974

Inventor(s) Joseph R. Petrella, John N. Shaw, and Jacob R. Peternel

It is certified that error appears in the above-identified patent and that said Letters Patent are hereby corrected as shown below:

Column 1, line 53, delete "repidly" and insert --rapidly--.

Column 1, line 63, delete "Farabuaugh" and insert --Farabaugh--.

Column 6, line 7, after "include" delete "adjustable" and insert --adjustment--.

Column 6, line 46, delete "130-143" and insert --130-145--.

Column 7, Table I, in the title delete "orrelation" and insert --Correlation--.

Column 7, Table I, in the second line of the title, delete "th" and insert --with--.

Column 12, line 29, delete "MRCE/$_{108}$/" and insert --MRCE$_{108}$/--.

Column 13, line 29, delete "94" and insert --84--.

Claim 1, line 22, Column 14, after "press" delete "being" and insert --bending--.

Signed and sealed this 21st day of January 1975.

(SEAL)
Attest:

McCOY M. GIBSON JR.
Attesting Officer

C. MARSHALL DANN
Commissioner of Patents